(12) United States Patent
Nagahashi

(10) Patent No.: US 11,999,306 B2
(45) Date of Patent: Jun. 4, 2024

(54) WIRE HARNESS FIXING MEMBER

(71) Applicant: SUMITOMO WIRING SYSTEMS, LTD., Mie (JP)

(72) Inventor: Naoya Nagahashi, Mie (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 349 days.

(21) Appl. No.: 17/600,304

(22) PCT Filed: Feb. 27, 2020

(86) PCT No.: PCT/JP2020/007997
§ 371 (c)(1),
(2) Date: Sep. 30, 2021

(87) PCT Pub. No.: WO2020/208970
PCT Pub. Date: Oct. 15, 2020

(65) Prior Publication Data
US 2022/0212613 A1    Jul. 7, 2022

(30) Foreign Application Priority Data
Apr. 8, 2019  (JP) .................................. 2019-073567

(51) Int. Cl.
*B60R 16/02* (2006.01)
*F16L 3/127* (2006.01)

(52) U.S. Cl.
CPC .......... *B60R 16/0215* (2013.01); *F16L 3/127* (2013.01)

(58) Field of Classification Search
CPC ...... B60R 16/0215; F16L 3/127; F16L 3/123; H02G 3/30

USPC .............................................. 296/187.01, 208
See application file for complete search history.

(56) References Cited

U.S. PATENT DOCUMENTS 6,311,934 B1* 11/2001 Fujii .................... F16L 3/04
 248/74.1
7,045,715 B2* 5/2006 Ono .................... B60R 16/0215
 174/72 A

FOREIGN PATENT DOCUMENTS

JP   H11-205959 A   7/1999
JP   2003-343526 A  12/2003
JP   2015-136236 A   7/2015

OTHER PUBLICATIONS

International Search Report dated Apr. 14, 2020 for WO 2020/208970 A1.

\* cited by examiner

*Primary Examiner* — Dennis H Pedder
(74) *Attorney, Agent, or Firm* — Venjuris, P.C.

(57) ABSTRACT

A wire harness fixing member that can easily accommodate dimensional error of a fixing target portion of a vehicle body is provided. A bracket (10), which is one aspect of the wire harness fixing member, includes a first fixing portion (16), a second fixing portion (23), and a rotation member (12) that is rotatably provided, and the second fixing portion (23) is provided on the rotation member (12). A rotation axis (L1) of the rotation member (12) is set so as to be orthogonal to an assembling direction (X axis direction) of the second fixing portion (23) and the height direction (Z axis direction) of the bracket (10). The distance between the second fixing portion (23) and the first fixing portion (16) changes as the rotation member (12) rotates about the rotation axis (L1).

4 Claims, 3 Drawing Sheets

WIRE HARNESS FIXING MEMBER

CROSS REFERENCE TO RELATED APPLICATIONS

This application is a national phase of PCT application No. PCT/JP2020/007997, filed on 27 Feb. 2020, which claims priority from Japanese patent application No. 2019-073567, filed on 8 Apr. 2019, all of which are incorporated herein by reference.

TECHNICAL FIELD

The present disclosure relates to a wire harness fixing member.

BACKGROUND

Conventionally, as a wire harness fixing member for fixing a wire harness to a vehicle body, there is a wire harness fixing member that is provided with a plurality of fixing portions that are to be fixed to a fixing target of a vehicle body (e.g., a vehicle body panel). Such fixing members include a first fixing portion that is to be fixed to a first fixing target portion of the vehicle body and a second fixing portion that is to be fixed to a second fixing target portion of the vehicle body. When such fixing members are molded, errors may occur with respect to the distance between the first fixing target portion and the second fixing target portion of the vehicle body. In view of this, by employing a straight sliding structure, for example, in which either the first fixing portion or the second fixing portion is the fixing portion shown in Patent Document 1 and comes into planar contact with the corresponding fixing target portion, it is possible to absorb error in the distance between the first fixing target portion and the second fixing target portion of the vehicle body.

PRIOR ART DOCUMENT

Patent Document

Patent Document 1: JP 2003-343526 A

SUMMARY OF THE INVENTION

Problems to be Solved

However, with a structure in which the fixing portion is slid while in planar contact with the fixing target portion as described above, the fixing portion, which is a sliding member, and the main body portion come into planar contact with each other, and there has been a problem that it is difficult to finely adjust the position of the fixing portion due to frictional resistance when sliding the fixing portion.

In view of this, an object of the present invention is to provide a wire harness fixing member that can easily accommodate dimensional error of a fixing target portion of a vehicle body.

Means to Solve the Problem

A wire harness fixing member according to the present disclosure is a wire harness fixing member for fixing a wire harness to a vehicle body, the wire harness fixing member including: a first fixing portion configured to be fixed to a first fixing target portion of the vehicle body; a second fixing portion configured to be fixed to a second fixing target portion of the vehicle body; a body portion having a support portion configured to support the wire harness; and a rotation member rotatably provided in the body portion, wherein the first fixing portion is provided so as to not be capable of moving relative to the body portion, the second fixing portion is provided on the rotation member, and the distance between the second fixing portion and the first fixing portion changes as the rotation member rotates.

Effect of the Invention

According to the present disclosure, it is possible to provide a wire harness fixing member that can easily accommodate dimensional error of a fixing target portion of a vehicle body.

DETAILED DESCRIPTION TO EXECUTE THE INVENTION

Description of Embodiments of Present Disclosure

Figure 1:
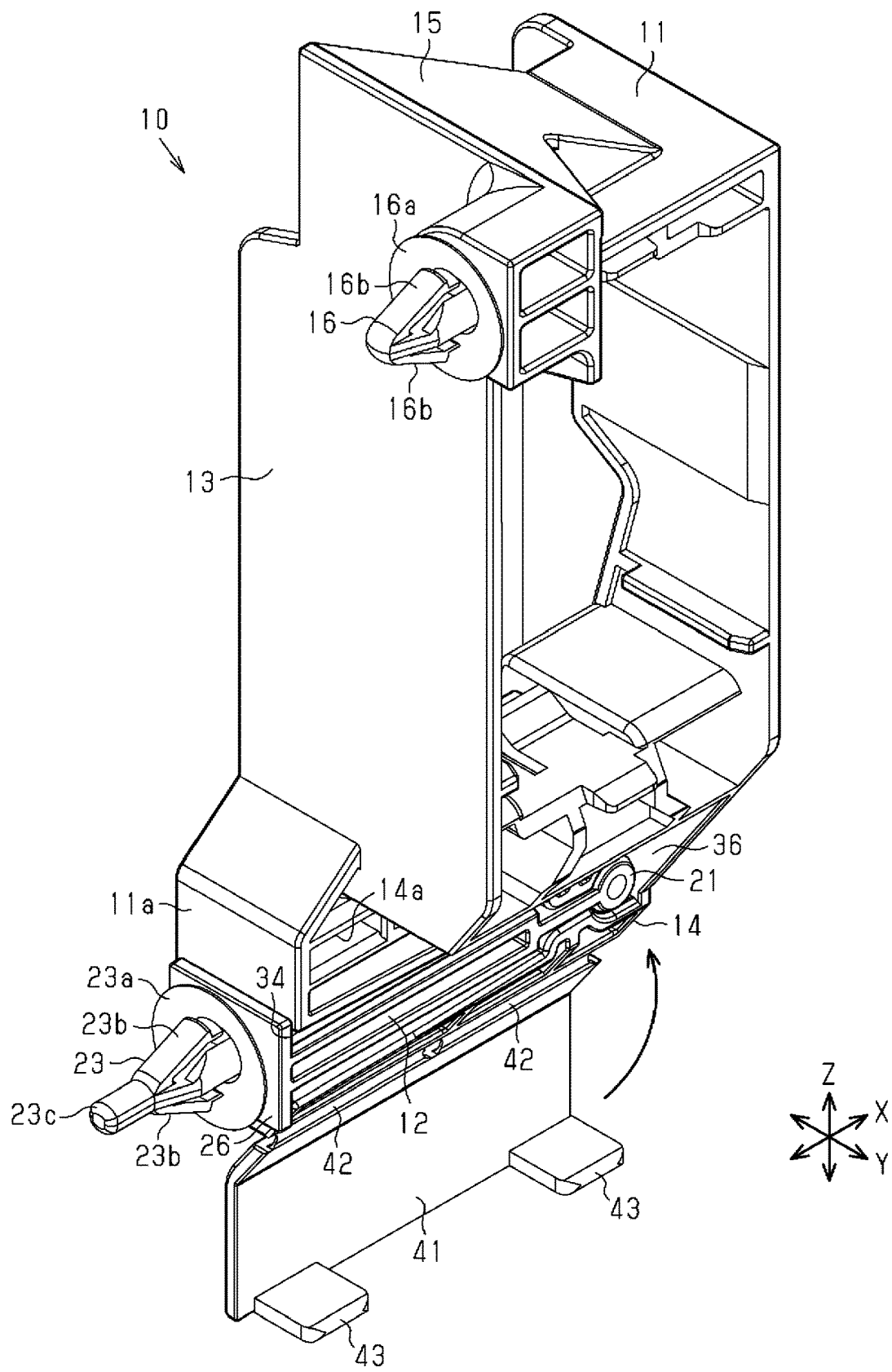
FIG. 1 is a perspective view of a bracket according to an embodiment.

First, embodiments of the present disclosure will be listed and described.

A wire harness fixing member according to the present disclosure is

[1] a wire harness fixing member for fixing a wire harness to a vehicle body, the wire harness fixing member including: a first fixing portion configured to be fixed to a first fixing target portion of the vehicle body; a second fixing portion configured to be fixed to a second fixing target portion of the vehicle body; a body portion having a support portion configured to support the wire harness; and a rotation member rotatably provided in the body portion, wherein the first fixing portion is provided so as to not be capable of moving relative to the body portion, the second fixing portion is provided on the rotation member, and the distance between the second fixing portion and the first fixing portion changes as the rotation member rotates.

According to the above aspect, the position of the second fixing portion relative to the first fixing portion can be adjusted by rotating the rotation member. This makes it possible to easily accommodate dimensional error between the first fixing target portion and the second fixing target portion of the vehicle body.

[2] It is preferable that the first fixing portion and the second fixing portion are provided in a region on one widthwise side of a center line in a width direction of the body portion, and a rotation axis of the rotation member is provided in a region on another widthwise side of the center line. According to this aspect, it is possible to ensure a certain length from the rotation axis of the rotation member to the second fixing portion.

[3] It is preferable that the rotation member includes a shaft portion that has a circular cross-section and forms the rotation axis, and the shaft portion comes into contact with an outer wall that constitutes one widthwise side face of the body portion. According to this aspect, the rotation axis (shaft portion) of the rotation member can be set at a position toward one end portion of the body portion in the width direction. Accordingly, this configuration is more favorable for ensuring a certain length from the rotation axis of the rotation member to the second fixing portion.

[4] It is preferable that the second fixing target portion is a hole, and the second fixing portion is provided projecting from the body portion so as to be able to be inserted into the second fixing target portion. According to this aspect, in the fixing structure in which the second fixing portion is inserted into and fixed to a hole of the vehicle body, it is possible to easily accommodate dimensional error between the first fixing target portion and the second fixing target portion of the vehicle body.

[5] It is preferable that the body portion includes a rotation member housing portion configured to house the rotation member, and a lid configured to cover an opening of the rotation member housing portion. According to this aspect, by placing the rotation member in the rotation member housing portion while the lid is open and then closing the lid, the rotation member can be more reliably held in the rotation member housing portion.

Details of Embodiments of Present Disclosure

A specific example of a wire harness fixing member according to the present disclosure will be described below with reference to the drawings. It should be noted that the present invention is not intended to be limited to these examples, but rather is indicated by the claims, and is intended to include all modifications within the meaning and scope equivalent to the scope of claims. Also, the term "parallel" in the present disclosure does not mean being parallel in a strict sense, but rather is to be interpreted broadly, such as that the effect of the present invention is exhibited as long as the positional relationship is considered to be parallel. Also, the term "orthogonal" in the present disclosure does not mean being orthogonal in a strict sense, but rather is to be interpreted broadly, such as that the effect of the present invention is exhibited as long as the positional relationship is considered to be orthogonal.

Figure 2:
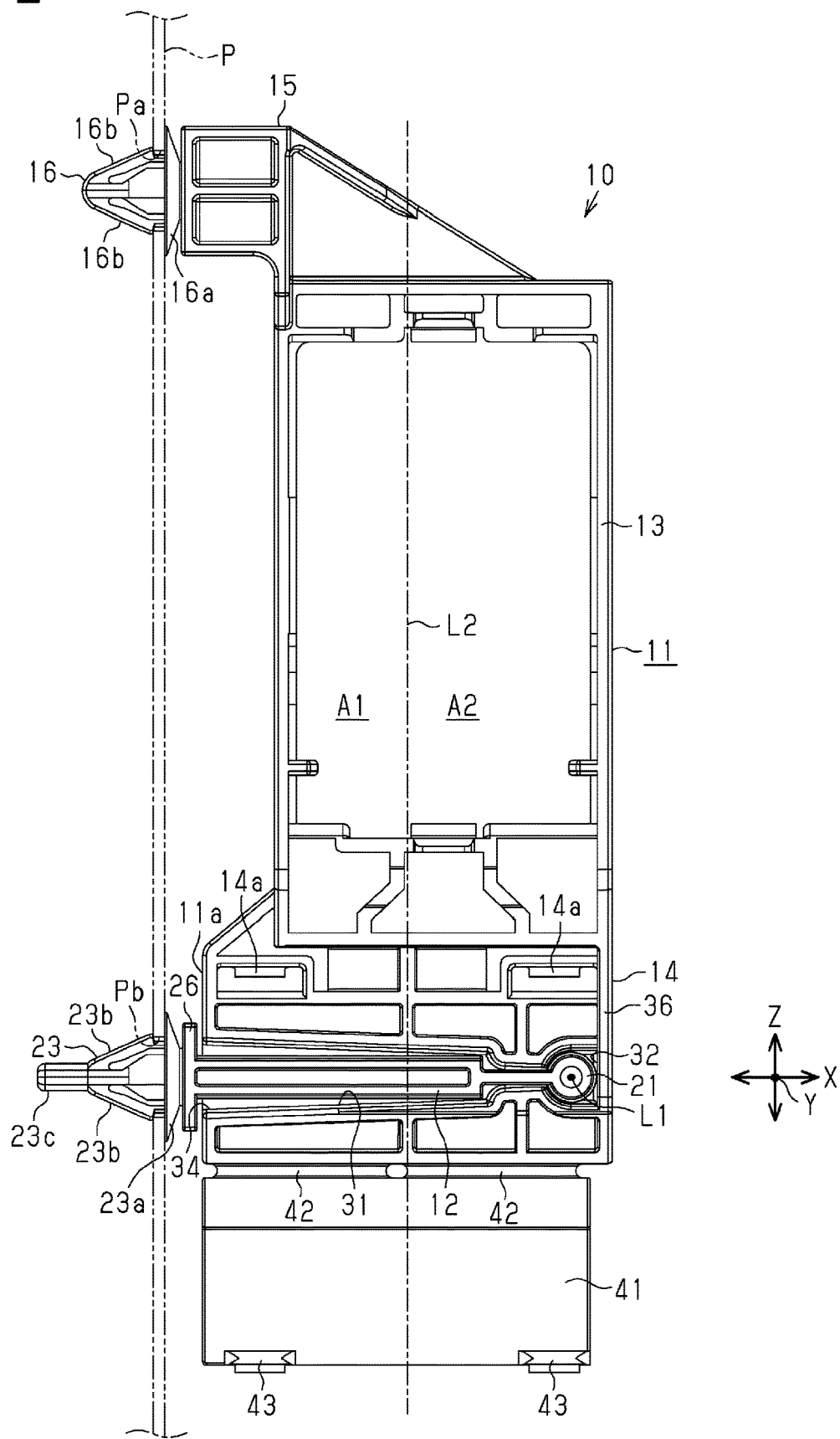
FIG. 2 is a front view of the bracket according to the embodiment.

As shown in FIGS. 1 and 2, a bracket 10 of the present embodiment is for use in a vehicle, and is for fixing a vehicle wire harness (not shown) to a vehicle body panel P. Note that out of X, Y, and Z axes that are orthogonal to each other in the drawings, the X axis represents the width direction of the bracket 10, the Y axis represents the depth direction of the bracket 10, and the Z axis represents the height direction of the bracket 10.

The bracket 10 includes a bracket body portion 11 that supports a connector of a wire harness (not shown), and a rotation member 12 that is assembled to the bracket body portion 11.

Configuration of Bracket Body Portion 11

The bracket body portion 11 is an injection-molded part that is made of a synthetic resin material. The bracket body portion 11 has a connector attachment portion 13 to which the connector is to be attached, and an assembly portion 14 to which the rotation member 12 is assembled. The connector attachment portion 13 has a substantially rectangular frame shape when viewed from the Y axis direction. When the connector is mounted the frame of the connector attachment portion 13, the wire harness is thus supported by the bracket 10.

The connector attachment portion 13 has an extension portion 15 that extends to one side in the width direction (X axis direction) from one end portion (the upper end portion in FIGS. 1 and 2) in the height direction (Z axis direction) of the connector attachment portion 13. A first fixing portion 16 is provided at the leading end portion of the extension portion 15 in the X axis direction. Note that the assembly portion 14 to which the rotation member 12 is assembled is integrally formed on the other end side (the lower side in FIGS. 1 and 2) of the connector attachment portion 13 in the height direction (Z axis direction).

Configuration of First Fixing Portion 16

The first fixing portion 16 is provided so as to project in the X axis direction from the leading end face of the extension portion 15. The first fixing portion 16 is formed as a single piece with the extension portion 15 or separately therefrom. Also, the first fixing portion 16 is provided so as to not be capable of moving relative to the bracket body portion 11. The first fixing portion 16 is fixed to the vehicle body panel P in a state of being inserted into a first fixing hole Pa formed so as to pass through the vehicle body panel P. Specifically, the first fixing portion 16 has an umbrella-shaped biasing portion 16a and a pair of locking portions 16b that face the biasing portion 16a. When the vehicle body panel P is sandwiched between the biasing portion 16a and the locking portions 16b in the thickness direction, the first fixing portion 16 is thus fixed to the vehicle body panel P. Note that it is preferable that the entire outer peripheral edge of the umbrella-shaped biasing portion 16a comes into contact with the periphery of the first fixing hole Pa on one side surface of the vehicle body panel P.

Configuration of Rotation Member 12

Figure 3:
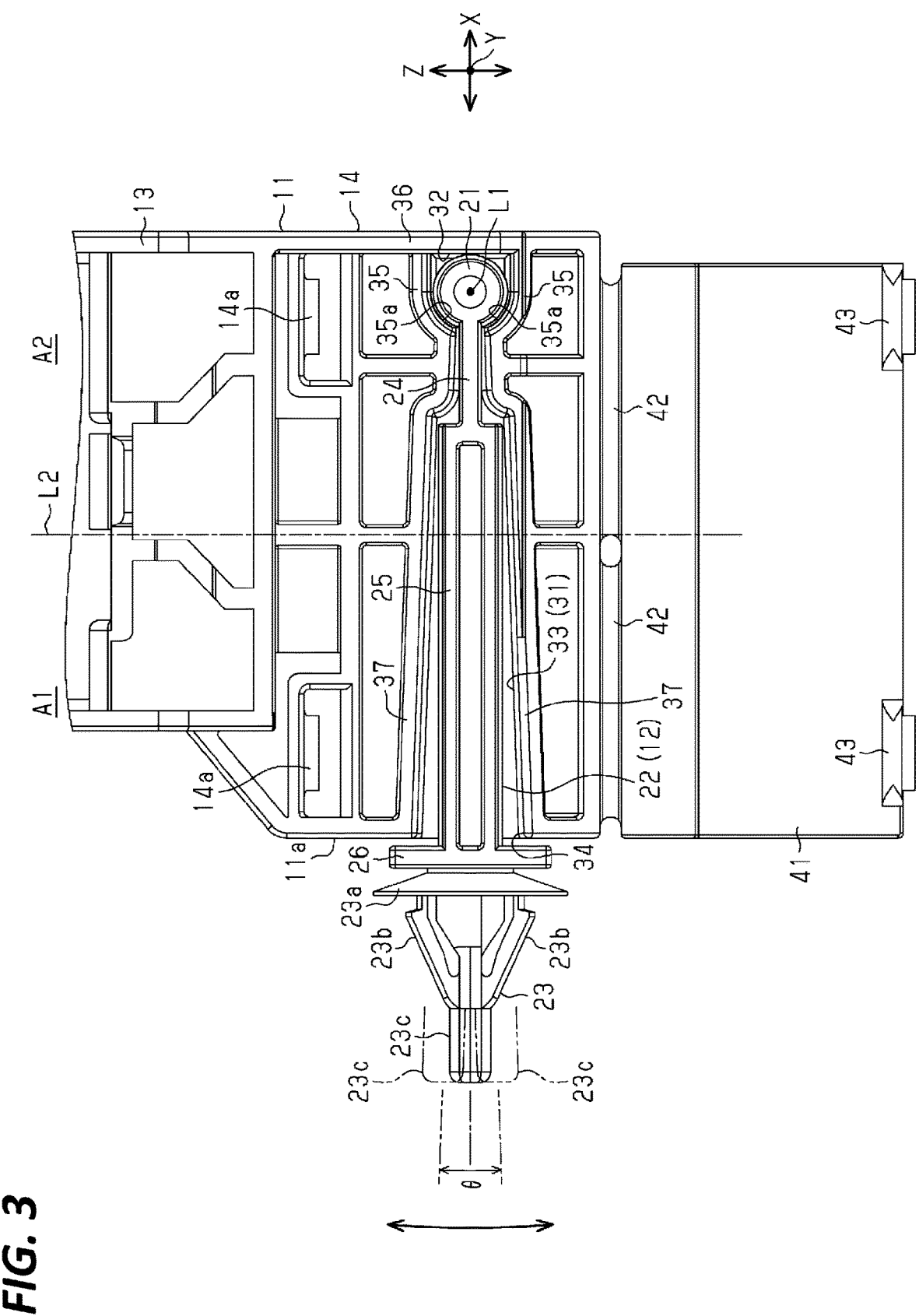
FIG. 3 is an enlarged front view of a portion of the bracket according to the embodiment.

As shown in FIG. 3, the rotation member 12 is assembled to the assembly portion 14 of the bracket body portion 11. The rotation member 12 is an injection-molded part that is made of a synthetic resin material. The rotation member 12 and the bracket body portion 11 are formed as separate bodies, that is to say separate parts. The rotation member 12 is an elongated member that is arranged extending along the width direction (X axis direction) of the bracket body portion 11. The rotation member 12 includes a cylindrical shaft portion 21, a body portion 22 that extends radially outward from the outer circumferential surface of the shaft portion 21, and a second fixing portion 23 provided at the leading end portion of the body portion 22. The central axis of the shaft portion 21 is parallel to the Y axis direction. The central axis of the shaft portion 21 is a rotation axis L1 of the rotation member 12. Also, the rotation axis L1 is orthogonal to a later-described assembly direction in which the first fixing portion 16 and the second fixing portion 23 are assembled to the vehicle body panel P (the projection direction of the first fixing portion 16 and the second fixing portion 23). Also, the rotation axis L1 is orthogonal to a direction (Z axis direction) that is parallel to a straight line that connects the first fixing portion 16 and the second fixing portion 23 when viewed from the front face (Y axis direction) of the bracket 10. In other words, the direction of the rotation axis L1 is set such that when the rotation member 12 rotates about the rotation axis L1, the second fixing portion 23 that rotates integrally with the rotation member 12 moves toward or away from the first fixing portion 16.

The body portion 22 of the rotation member 12 has a base portion 24, an intermediate portion 25, and a flange portion 26. The base portion 24 is a plate-shaped portion that extends radially outward from the outer circumferential surface of the shaft portion 21. The base end portion side of the base portion 24 is connected to the shaft portion 21, and the leading end portion side is connected to the intermediate portion 25. When viewed from the axial direction (Y axis direction) of the shaft portion 21, the thickness of the base portion 24 is smaller than the diameter of the shaft portion 21.

The base end portion side of the intermediate portion 25 is connected to the base portion 24, and the leading end portion side is connected to the flange portion 26. When viewed from the axial direction (Y axis direction) of the shaft portion 21, the thickness of the intermediate portion 25 is larger than that of the base portion 24. The flange portion 26 formed at the leading end portion of the intermediate portion 25 extends to both sides in the thickness direction of the intermediate portion 25.

Configuration of Second Fixing Portion 23

The second fixing portion 23 is provided so as to project in the X axis direction from the leading end face of the body portion 22 of the rotation member 12. The second fixing portion 23 projects in substantially the same direction as the projection direction of the first fixing portion 16. Note that the second fixing portion 23 is formed as a single piece with the body portion 22 or separately therefrom.

The second fixing portion 23 is fixed to the vehicle body panel P in a state of being inserted into a second fixing hole Pb formed so as to pass through the vehicle body panel P. Specifically, the second fixing portion 23 has an umbrella-shaped biasing portion 23a and a pair of locking portions 23b that face the biasing portion 23a. When the vehicle body panel P is sandwiched between the biasing portion 23a and the locking portions 23b in the thickness direction, the second fixing portion 23 is thus fixed to the vehicle body panel P. Note that it is preferable that the entire outer peripheral edge of the umbrella-shaped biasing portion 23a comes into contact with the periphery of the second fixing hole Pb on one side face of the vehicle body panel P. Also, the biasing portion 23a is configured so as to be able to come into contact with the flange portion 26. The flange portion 26 serves to press the biasing portion 23a such that the biasing portion 23a is favorably in contact with the vehicle body panel P side. Also, a substantially columnar extension portion 23c that extends along the lengthwise direction of the rotation member 12 is formed at the leading end portion of the second fixing portion 23.

Configuration of Assembly Portion 14

The assembly portion 14 of the bracket body portion 11 has a rotation member housing portion 31 that houses the rotation member 12. The rotation member housing portion 31 includes a bearing portion 32 that pivotally supports the shaft portion 21 of the rotation member 12, a body portion housing portion 33 that houses the body portion 22 of the rotation member 12, and an opening portion 34 for allowing the leading end portion of the rotation member 12 to project out from the rotation member housing portion 31.

The bearing portion 32 has a space that is partitioned by a pair of support wall portions 35 that each have an arc-shaped support face 35a that extends along the outer circumferential surface of the shaft portion 21, and an outer wall 36 that forms one width-direction side face of the bracket body portion 11. The outer wall 36 forms a portion of the outer shape of the bracket body portion 11 as viewed from the direction of the rotation axis L1. When rotatably housed in the bearing portion 32, the shaft portion 21 comes into contact with the inner face of the outer wall 36. The pair of support wall portions 35 face each other in the height direction (Z axis direction).

The body portion housing portion 33 is in communication with the bearing portion 32. The body housing portion 33 has a pair of limiting walls 37 that limit the rotation angle of the rotation member 12 to a predetermined range θ. The limiting walls 37 face each other in the height direction (Z axis direction). The body portion 22 of the rotation member 12 is housed between the limiting walls 37. The limiting walls 37 extend up to one widthwise side face 11a of the bracket body portion 11 (the side face on the side opposite to the outer wall 36 in the width direction). The opening portion 34 is formed in the one widthwise side face 11a of the bracket body portion 11, at a position between the limiting walls 37.

The second fixing portion 23 provided at the leading end portion of the rotation member 12 is configured to project in the width direction (X axis direction) from the one widthwise side face 11a of the bracket body portion 11. Also, the flange portion 26 of the rotation member 12 is configured to face the one widthwise side face 11a of the bracket body portion 11. Moreover, the first fixing portion 16 and the second fixing portion 23 are provided in a region (first region A1) on one widthwise side of a center line L2 in the width direction (X axis direction) of the bracket body portion 11. On the other hand, the bearing portion 32 and the rotation axis L1 (shaft portion 21) of the rotation member 12 are provided in a region (second region A2) on the other widthwise side of the center line L2. Note that the center line L2 in the width direction of the bracket body portion 11 is set at the center between the one widthwise side face 11a of the bracket body portion 11 and the outer face of the outer wall 36.

The rotation member housing portion 31 has an opening on one side in the Y axis direction so that the rotation member 12 can be attached from one side in the Y axis direction, and the opening is closed by a lid 41. Note that FIGS. 1 to 3 show a state in which the lid 41 is open. The free ends of the limiting walls 37 and the one end of the bearing portion 32 in the Y axis direction are covered by the lid 41. The lid 41 of the present embodiment is formed as a single piece with the bracket body portion 11. The lid 41 is provided in a lower end portion of the bracket body portion 11 so as to be capable of rotating via a hinge portion 42. Also, the assembly portion 14 of the bracket body portion 11 is provided with a lock partner portion 14a that is fixed by being locked to a locking portion 43 of the lid 41 at a position where the lid 41 covers the rotation member housing portion 31.

Operations of the present embodiment will be described below.

The rotation member 12 rotates about the rotation axis L1 of the shaft portion 21, which is pivotally supported by the bearing portion 32, within the rotation range defined by the limiting walls 37. As the rotation member 12 rotates, the position of the second fixing portion 23 in the height direction (Z axis direction) changes. The second fixing portion 23 opposes the first fixing portion 16 in the height direction (Z axis direction). In other words, as the rotation member 12 rotates about the rotation axis L1, the distance between the first fixing portion 16 and the second fixing portion 23 changes.

Also, out of the first region A1 and the second region A2 that are divided by the center line L2 in the width direction of the bracket body portion 11, the rotation axis L1 of the rotation member 12 is set in the second region A2, rather than in the first region A1 in which the second fixing portion 23 is provided. Accordingly, a certain length can be ensured from the rotation axis L1 to the second fixing portion 23. By increasing the length from the rotation axis L1 to the second fixing portion 23, it is possible to reduce the angle by which the rotation member 12 needs to rotate in order to obtain a desired swing width (adjustment width) of the second fixing portion 23 in the height direction.

Furthermore, the shaft portion 21 of the rotation member 12 is configured to be in contact with the outer wall 36 on the side opposite to the first fixing portion 16 and the second fixing portion 23 in the width direction. Accordingly, this configuration is more favorable for ensuring a certain length from the rotation axis L1 to the second fixing portion 23.

Effects of the present embodiment will be described below.

(1) The bracket 10 includes the first fixing portion 16 and the second fixing portion 23 that are configured to be fixed to the vehicle body panel P, and the rotation member 12 that is pivotably provided in the bracket body portion 11, and the second fixing portion 23 is provided on the rotation member 12. The rotation axis L1 of the rotation member 12 is set orthogonal to the assembling direction (X axis direction) of the second fixing portion 23 and the height direction (Z axis direction) of the bracket 10 (i.e., is set along the Y axis direction of bracket 10). The distance between the second fixing portion 23 and the first fixing portion 16 changes as the rotation member 12 rotates about the rotation axis L1. According to this aspect, the position of the second fixing portion 23 relative to the first fixing portion 16 can be adjusted by rotating the rotation member 12. Accordingly, it is possible to accommodate dimensional error between the first fixing hole Pa and the second fixing hole Pb of the vehicle body. Note that in the present disclosure, dimensional error between the first fixing target portion and the second fixing target portion of the vehicle body includes, for example, error in the distance or the shortest distance between the first fixing hole Pa and the second fixing hole Pb that arises due to variation in the positions at which the first fixing hole Pa and the second fixing hole Pb are formed in the vehicle body panel P, and/or error in the distance or the shortest distance between the first fixing hole Pa and the second fixing hole Pb that arises due to variation in the hole diameters of the first fixing hole Pa and the second fixing hole Pb.

Also, unlike the prior art, the configuration of the present embodiment is not a configuration in which a sliding member provided with a fixing portion comes into planar contact with a bracket body portion, but rather the rotation member 12 is configured to be able to rotate via the shaft portion 21. For this reason, the frictional resistance generated due to adjustment of the position of the second fixing portion 23 (i.e., rotation of the rotation member 12) can be made extremely small, and as a result, it is possible to easily accommodate dimensional error between the first fixing hole Pa and the second fixing hole Pb of the vehicle body.

(2) The first fixing portion 16 and the second fixing portion 23 are provided in a region (first region A1) on one widthwise side of the center line L2 in the width direction of the bracket body portion 11. Also, the rotation axis L1 of the rotation member 12 is provided in a region (second region A2) on the other widthwise side of the center line L2. According to this aspect, it is possible to ensure a certain length from the rotation axis L1 of the rotation member 12 to the second fixing portion 23. By increasing the length from the rotation axis L1 to the second fixing portion 23, it is possible to reduce the angle by which the rotation member 12 needs to rotate in order to obtain a desired swing width (adjustment width) of the second fixing portion 23 in the height direction.

Here, according to the configuration in which the second fixing portion 23 is provided on the rotation member 12 as described above, depending on the rotation position of the rotation member 12, instead of the second fixing portion 23 being parallel with the first fixing portion 16, the second fixing portion 23 may be inclined relative to the bearing surface of the vehicle body panel P (the surface surrounding the second fixing hole Pb). At this time, if the amount of inclination of the second fixing portion 23 (the angle of the rotation member 12) is large, the second fixing portion 23 cannot be favorably fixed to the second fixing hole Pb. In other words, it is preferable that the amount of inclination of the second fixing portion 23 is limited to a range in which the locking portions 23b can come into contact with the vehicle body panel P, and furthermore the entire outer peripheral edge of the umbrella-shaped biasing portion 23a can come into contact with the vehicle body panel P. In view of this, in the present embodiment, a certain length from the rotation axis L1 to the second fixing portion 23 is ensured such that the position of the second fixing portion 23 can be adjusted as desired even if the rotation angle of the rotation member 12 is small.

(3) The rotation member 12 includes the shaft portion 21 that has a circular cross-section and forms the rotation axis L1, and the shaft portion 21 is in contact with the outer wall 36 that constitutes one widthwise side face of the bracket body portion 11. According to this aspect, the rotation axis L1 (shaft portion 21) of the rotation member 12 can be set at a position toward one end portion of the bracket body portion 11 in the width direction. Accordingly, this configuration is even more favorable to ensuring a certain length from the rotation axis L1 of the rotation member 12 to the second fixing portion 23.

(4) The second fixing portion 23 is provided projecting from the bracket body portion 11 so as to be able to be inserted into the second fixing hole Pb. According to this aspect, in the fixing structure in which the second fixing portion 23 is inserted into and fixed to the second fixing hole Pb of the vehicle body, it is possible to easily accommodate dimensional error between the first fixing hole Pa and the second fixing hole Pb of the vehicle body.

(5) The bracket body portion 11 includes the rotation member housing portion 31 that houses the rotation member 12, and the lid 41 that covers the opening of the rotation member housing portion 31. According to this aspect, by placing the rotation member 12 in the rotation member housing portion 31 while the lid 41 is open and then closing the lid 41, the rotation member 12 can be more reliably held in the rotation member housing portion 31.

The present embodiment can be implemented with modifications such as the following. The present embodiment and the following variations can be implemented in combination with each other as long as no technical contradictions arise.

In the above embodiment, the first fixing portion 16 and the second fixing portion 23 are configured to project from the bracket body portion 11 in the width direction (X axis direction), but the present invention is not limited to this, and the first fixing portion 16 and the second fixing portion 23 may be configured to project from the bracket body portion 11 in the depth direction (the Y axis direction, which is parallel to the rotation axis L1).

The fixing structure of the first and second fixing portions 16 and 23 of the bracket 10 and the first and second fixing holes Pa and Pb of the vehicle body panel P is not limited to the above embodiment, and can be changed to bolt fastening, for example.

The rotation axis L1 of the rotation member 12 may be set in the first region A1.

The lid 41 may be configured separately from the bracket body portion 11.

In the above embodiment, the bracket 10 is fixed to the vehicle body panel P, but alternatively, for example, a configuration is possible in which an intervening member such as a bracket attached to the vehicle body panel P or the like is the fixing target, and the bracket 10 is attached to the intervening member.

It is sufficient that the distance between the first fixing portion 16 of the bracket body portion 11 and the second fixing portion 23 of the rotation member 12 can be adjusted according to the rotation angle of the rotation member 12 around the rotation axis L1 relative to the bracket body portion 11. For example, the bracket body portion 11 may be configured to allow the rotation member 12 to rotate about the rotation axis L1 in a predetermined limited rotation angle range. Alternatively, a configuration is possible in which the bracket body portion 11 holds the rotation member 12 at a predetermined selected angle in a predetermined limited rotation angle range, and the rotation member 12 does not rotate in the state where the rotation member 12 has been attached to the bracket body portion 11.

The rotation member 12 of the embodiment is one example of a lever that rotates about the rotation axis L1. The body portion 22 of the rotation member 12 of the embodiment is an example of an elongated portion that extends orthogonally to the rotation axis L1. The shaft portion 21 of the rotation member 12 may be formed at the base end portion of the elongated portion that can be the body portion 22. The second fixing portion 23 of the rotation member 12 may be formed at the leading end portion or the tip of an elongated portion that can be the body portion 22.

The connector attachment portion 13 of the embodiment is an example of a wire harness support portion configured to support the wire harness, and may be simply referred to as a support portion.

The present disclosure includes the following implementation example. Reference symbols have been added to the components of the embodiments, not for limitation, but as an aid to understanding.

[Note 1]

A wire harness fixing member (10) can include:

a bracket body portion (11) that includes a first fixing portion (16) configured to be fixedly attached to a first fixing target position (Pa) of a vehicle body, and a wire harness support portion (13) configured to engage with a wire harness and support the wire harness; and a lever (12) that is separate from the bracket body portion (11) and is configured to be attached to the bracket body portion (11), wherein the lever (12) can include an elongated portion (22) having a leading end portion and a base end portion, a shaft portion (21) that is formed at the base end portion of the elongated portion (22) and has a rotation axis (L1), and a second fixing portion (23) that is formed at the leading end portion of the elongated portion (22) and is configured to be fixedly attached to a second fixing target position (Pb) of the vehicle body, and the distance between the first fixing portion (16) of the bracket body portion (11) and the second fixing portion (23) of the lever (12) can be adjusted according to a rotation angle of the lever (12) around the rotation axis (L1) relative to the bracket body portion (11).

LIST OF REFERENCE NUMERALS

A1 First region
A2 Second region
L1 Rotation axis
L2 Center line in width direction
P Vehicle body panel
Pa First fixing hole (first fixing target portion)
Pb Second fixing hole (second fixing target portion)
10 Bracket (wire harness fixing member)
11 Bracket body portion (body portion)
11a One widthwise side face
12 Rotation member
13 Connector attachment portion (support portion)
14 Assembly portion
14a Lock partner portion
15 Extension portion
16 First fixing portion
16a Biasing portion
16b Locking portion
21 Shaft portion
22 Body portion
23 Second fixing portion
23a Biasing portion
23b Locking portion
23c Extension portion
24 Base portion
25 Intermediate portion
26 Flange portion
31 Rotation member housing portion
32 Bearing portion
33 Body portion housing portion
34 Opening portion
35 Support wall portion
35a Support face
36 Outer wall
37 Limiting wall
41 Lid
42 Hinge portion
43 Locking portion

What is claimed is:

1. A wire harness fixing member comprising:
a first fixing portion configured to be fixed to a first fixing target portion of a vehicle body;
a second fixing portion configured to be fixed to a second fixing target portion of the vehicle body;
a body portion having a support portion configured to support the wire harness; and
a rotation member rotatably provided in the body portion,
wherein the first fixing portion is provided so as to not be capable of moving relative to the body portion,
the second fixing portion is provided on the rotation member,
the distance between the second fixing portion and the first fixing portion changes as the rotation member rotates the first fixing portion and the second fixing portion are provided in a region on one widthwise side of a center line in a width direction of the body portion, and
a rotation axis of the rotation member is provided in a region on another widthwise side of the center line.

2. The wire harness fixing member according to claim 1, wherein the rotation member includes a shaft portion that has a circular cross-section and forms the rotation axis, and
the shaft portion comes into contact with an outer wall that constitutes one widthwise side face of the body portion.

3. The wire harness fixing member according to claim 1, wherein the second fixing target portion is a hole, and
the second fixing portion is provided projecting from the body portion so as to be able to be inserted into the second fixing target portion.

4. The wire harness fixing member according to claim 1, wherein the body portion includes a rotation member housing portion configured to house the rotation member, and a lid configured to cover an opening of the rotation member housing portion.

\* \* \* \* \*